United States Patent [19]

Tootle et al.

[11] Patent Number: 4,463,657
[45] Date of Patent: Aug. 7, 1984

[54] FLUID ACTUATOR WITH SEQUENCE-POWER VALVE

[75] Inventors: James N. Tootle, Kalamazoo; Eugene J. Martin, Portage, both of Mich.

[73] Assignee: Pneumo Corporation, Boston, Mass.

[21] Appl. No.: 352,046

[22] Filed: Feb. 24, 1982

[51] Int. Cl.³ .............................................. F15B 15/26
[52] U.S. Cl. ........................................ 91/44; 92/17; 92/25; 92/27
[58] Field of Search .................... 92/15, 17, 23, 24, 25, 92/27, 28; 91/41, 44, 45

[56] References Cited

U.S. PATENT DOCUMENTS

| | | | |
|---|---|---|---|
| 2,349,244 | 5/1944 | Brown | 92/27 |
| 2,535,588 | 12/1950 | Mead | 92/21 MR |
| 3,348,454 | 10/1967 | Kahn et al. | 91/44 |
| 3,442,176 | 5/1969 | Geyer | 91/44 |

Primary Examiner—Robert E. Garrett
Assistant Examiner—Richard L. Klein
Attorney, Agent, or Firm—Maky, Renner, Otto & Boisselle

[57] ABSTRACT

A fluid actuator including a lock mechanism for locking the actuator against movement in one position and a fluid operated sequence-power valve which when actuated by fluid pressure releases the lock mechanism and then ports such fluid pressure directly to the actuator to cause movement thereof in the desired direction following release of the lock mechanism.

27 Claims, 5 Drawing Figures

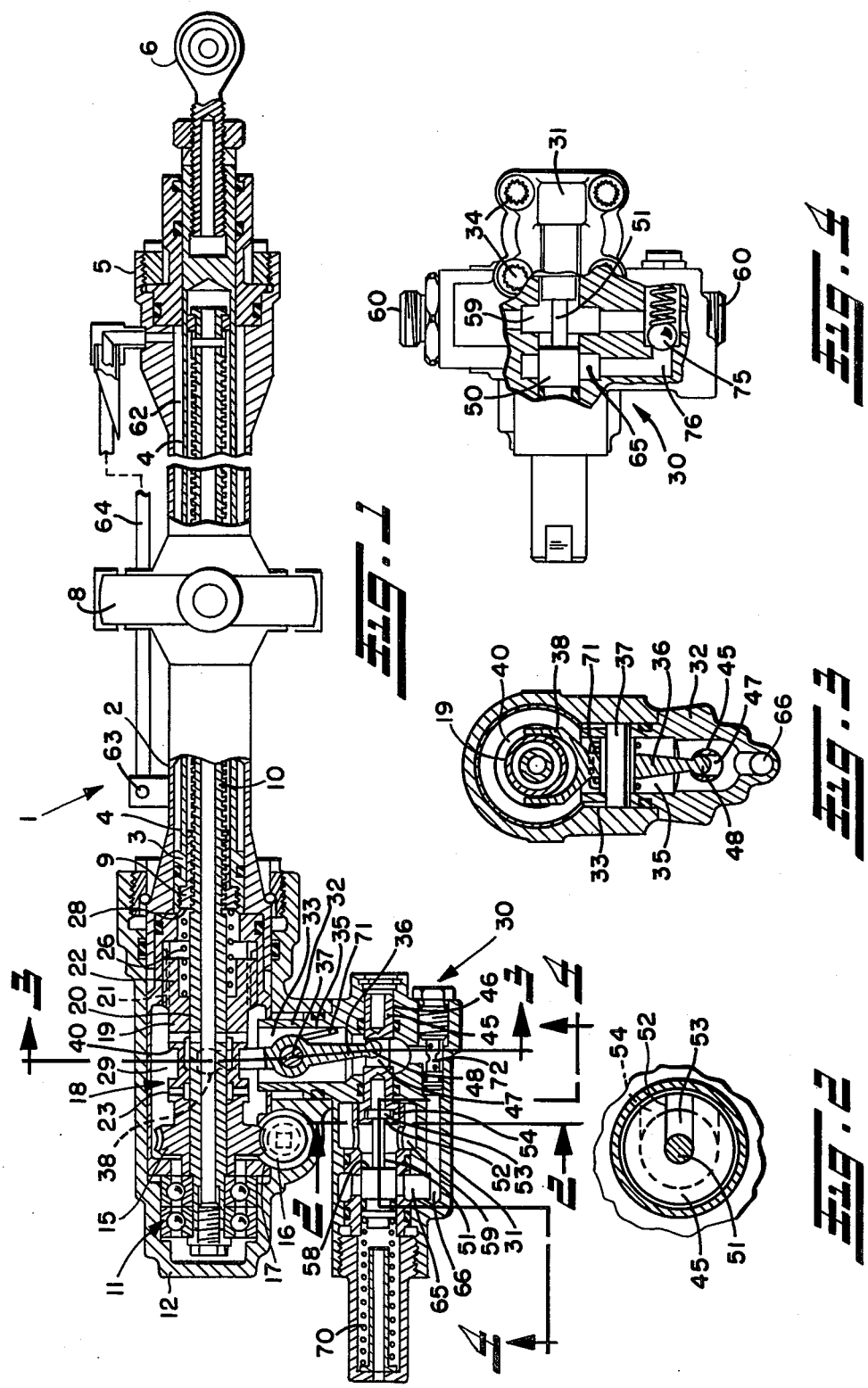

FLUID ACTUATOR WITH SEQUENCE-POWER VALVE

BACKGROUND OF THE INVENTION

This invention relates generally as indicated to a fluid actuator with sequence-power valve, and more particularly, to such an actuator in which a sequence-power valve is used first to release a lock mechanism that locks the actuator against movement in one position, and then to port the fluid pressure directly to the actuator to effect the desired movement thereof.

Heretofore, it was known to utilize a lock valve for releasing such a lock mechanism. However, a separate valve mechanism was required to direct the fluid pressure to the actuator to cause the desired movement thereof following release of the lock, which not only added to the complexity of the system, but also necessitated the use of considerable external tubing to provide the necessary fluid connections from the lock valve to the valve mechanism and back to the actuator.

SUMMARY OF THE INVENTION

With the foregoing in mind, it is a principal object of this invention to provide a fluid actuator in which a single valve mechanism is used first to release the actuator lock mechanism and then to port fluid pressure to the actuator for actuating same following release of the lock.

Another object is to provide such an actuator in which the same fluid pressure that is used to actuate the valve mechanism to release the lock is ported through the valve mechanism directly to the actuator after the lock has been released.

Still another object is to provide such an actuator in which a lock disengaging force is continuously applied to the lock mechanism to maintain the lock mechanism unlocked except when the actuator nears the position at which locking takes place.

A further object is to provide such an actuator in which the valve mechanism is maintained substantially fully open for maximum flow to the actuator during the application of operating pressure thereto despite fluctuations in such operating pressure.

These and other objects of the present invention may be achieved by providing a fluid actuator with an internal lock mechanism for locking the actuator against movement in one position, and a fluid operated sequence-power valve mechanism which, upon being supplied with fluid pressure, first releases the lock mechanism and then ports such fluid pressure directly to the actuator to cause same to move in the desired direction. The valve mechanism includes a valve piston which is driven in one direction by such fluid pressure to create a lock release force that is transmitted to the movable lock part by a toggle type lock release lever therebetween. A restrictor in the flow path from the valve mechanism to the actuator assists in maintaining the valve piston in a position in which such flow path is substantially fully open for substantially full flow to the actuator during operation thereof despite fluctuations in such fluid pressure.

During return movement of the actuator, a torsion spring acting on the lever will cause the lock mechanism to remain unlocked until the actuator nears such one position, at which time a lock spring interposed between the movable lock part and actuator piston is compressed sufficiently to overcome the force of the torsion spring and reengage the lock. A lost-motion connection between the valve piston and lever permits return movement of the valve piston without affecting the position of the lever.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In said annexed drawings:

FIG. 1 is a fragmentary longitudinal section through a fluid actuator and sequence-power valve in accordance with the present invention;

FIG. 2 is an enlarged transverse section through the valve of FIG. 1 taken on the plane of the line 2—2 thereof to show the interconnection between the lock valve and lock plunger;

FIG. 3 is an enlarged fragmentary transverse section through the valve and lock mechanism of FIG. 1 taken along the plane of the line 3—3 thereof to show the interconnection between the lock plunger and movable lock part;

FIG. 4 is an enlarged fragmentary plan view of the valve of FIG. 1 with portions broken away substantially along the plane of the line 4—4 to show the return flow path from the actuator bypassing the lock valve.

DETAILED DESCRIPTION OF THE PREFERRED EMBODIMENT

Figure 5:
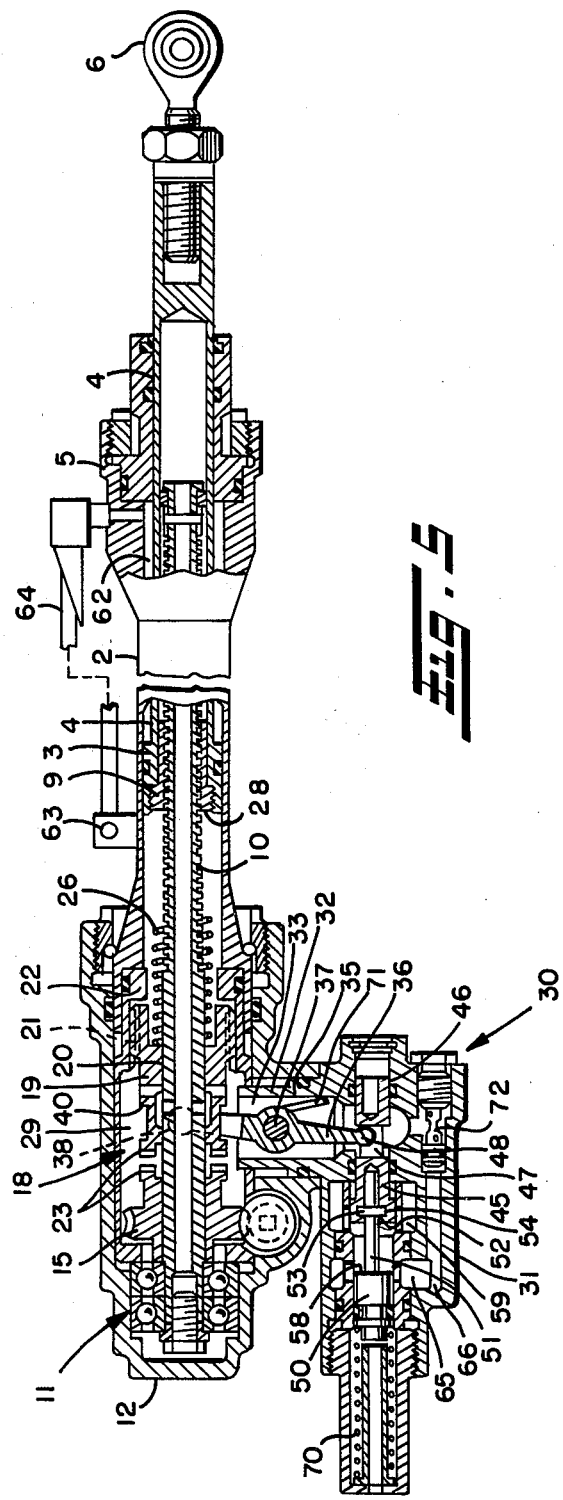
FIG. 5 is a fragmentary longitudinal section through the actuator and valve similar to FIG. 1, but showing the lock disengaged by actuation of the valve and the valve in a position providing for direct flow of fluid through the valve to the extend side of the actuator.

Referring now in detail to the drawings, and initially to FIG. 1 thereof, there is shown a fluid actuator 1 including a cylinder 2 containing a piston 3 axially movable therewithin. Attached to the piston is a hollow rod 4 which extends through the rod end 5 of the cylinder and has a rod end assembly 6 on its outboard end to facilitate connection to the movable or stationary part of the device to be actuated, for example, the thrust reversers for a jet engine on an aircraft. A suitable trunnion mount 8 may also be provided on the cylinder to facilitate connection to the other part of the device to be actuated.

The piston 3 has a high lead Acme nut 9 in the center thereof which is coupled to a mating Acme screw shaft 10. One end of the screw shaft may be journaled in suitable bearings 11 within an actuator housing 12 attached to the head end of the cylinder. The other end of the screw shaft extends into the hollow piston rod 4 a substantial distance beyond the nut. As the piston moves back and forth in the cylinder, the screw shaft rotates at a speed proportional to the velocity of the piston.

The screw shaft 10 has a high lead worm wheel 15 attached thereto which mates with a worm shaft 16 mounted for rotation within a transverse bore 17 in the actuator housing. Since the speed of the worm shaft is also proportional to the velocity of the piston rod, when the worm shafts of two or more actuators are connected together by a synchronous drive shaft or the like, they will be mechanically synchronized in both position and motion, as well known in the art.

When the actuator is in the retracted or stowed position shown in FIG. 1, such actuator may be locked in such position by a lock mechanism 18 which may include a movable lock sleeve 19 axially movable within the actuator housing toward and away from the adjacent end of the worm gear 15. The lock sleeve 19 has a central opening 20 through which the screw shaft 10 extends, with sufficient clearance therebetween to permit rotation of the screw shaft relative to the lock sleeve. To prevent rotation of the lock sleeve within the actuator housing 12 while permitting limited axial movement therewithin, a splined connection 21 is provided between the movable lock sleeve and a piston stop 22 within the actuator housing.

The adjacent end faces of the worm gear 15 and movable lock sleeve 19 have cooperating lock teeth 23 thereon with ramp angles which when engaged permit ratcheting of the worm gear relative to the movable lock sleeve during retraction of the piston but not during extension thereof. Accordingly, the piston will continue to retract until it engages the retract stop 22. However, if at any time during such ratcheting an attempt is made to reverse the piston direction, the lock teeth will instantly engage thus locking the screw shaft 10 against rotation and preventing the piston from extending.

When the piston 2 is fully retracted, the movable lock sleeve 19 is normally maintained in engagement with the worm gear 15 by a lock spring 26 interposed between the movable lock sleeve and piston head 28. During retraction of the actuator, as the piston approaches the end of its stroke, the piston head compresses the lock spring, causing the teeth on the movable lock sleeve to move into engagement with the teeth on the worm gear.

Before the actuator can be extended, the lock sleeve 19 must be moved away from the worm gear 15 to disengage the lock teeth 23, and then system pressure must be applied to the extend side 29 of the actuator. In accordance with the present invention, both such functions are accomplished by actuation of a sequence-power valve 30, the details of which will be described hereafter. Such sequence-power valve may be contained in a separate housing 31 having a generally right angle extension 32 at one end adapted to be received in a valve port 33 in one side of the actuator housing 12 and releasably retained in place as by bolts 34 or the like (see FIG. 4). The extension contains a transverse bore 35 in which a toggle type lock release lever 36 is mounted on a shaft 37 for limited pivotal movement. The inner end of the lock release lever extends into the actuator housing and has a fork 38 thereon surrounding the movable lock sleeve 19. When the lever 36 is pivoted about the shaft 37 in a generally clockwise direction as viewed in FIGS. 1 and 5, the fork 38 will engage a shoulder 40 on the movable lock sleeve thus forcing the movable lock sleeve out of engagement with the worm gear 15 as shown in FIG. 5.

For effecting such pivotal movement of the lock release lever, a movable lock plunger 45 is provided in a longitudinal bore 46 in the sequence-power valve housing 31 extending in a direction generally parallel to the longitudinal axis of the actuator cylinder. The lock plunger has a longitudinal slot 47 therein which receives the outer end 48 of the lock release lever 36.

Also contained in the longitudinal bore 46 adjacent one end of the lock plunger 45 is a lock piston 50. To facilitate attachment of the lock plunger to the lock piston, the lock piston has a stem 51 on the inner end thereof which is received in a longitudinal slot 52 in the outer end of the lock plunger. At the innermost end of the stem is a flange or shoulder 53 which is received in a transverse slot 54 in the lock plunger intersecting the inner end of the longitudinal slot 52. Both such slots 52, 54 extend into the lock plunger 45 from the same side as shown in FIG. 2 to permit the stem and flange to be inserted therein before the lock plunger and piston are inserted into the longitudinal bore 46. Such a connection between the lock plunger 45 and piston 50 will take care of any slight axial misalignment that may exist between these two parts, thus eliminating the need for having to make them perfectly concentric.

The lock piston 50 has a differential area 58 which is acted upon by fluid pressure admitted to a lock-in annulus 59 within the bore 46 through an exterior port 60 (see FIG. 4) to cause the lock piston 50 to move to the left as viewed in FIGS. 1 and 5, dragging the lock plunger 45 with it. This causes the lock release lever 36 to pivot about the shaft 37 and move the lock sleeve 19 axially inwardly against the force of the lock spring 26 to disengage the lock sleeve from the worm gear as shown in FIG. 5.

Before system pressure is admitted to the lock-in annulus 59 for effecting release of the lock, such system pressure is desirably applied to the retract side 62 of the actuator through a retract port 63 and porting tube 64 to remove any axial tension loads on the actuator which might otherwise interfere of the lock. Then, with system pressure still applied to the retract port, system pressure is also applied to the lock-in annulus 59 to release the lock in the manner previously described.

After the lock piston 50 has moved far enough to release the lock, the system pressure acting on the lock piston is ported to the extend side 29 of the actuator through another annulus 65 in the lock piston bore 46 which is uncovered by the lock piston following such movement as shown in FIG. 5. This annulus communicates with the extend side of the actuator through a passageway 66 in the sequence-power valve housing 31 which is connected to the outer end of the transverse bore 35 in such housing. The fluid entering such transverse bore flows around the lock plunger 45 and lock release lever 36 and into the extend side of the actuator through the valve port 33 in the actuator housing 12. System pressure is then communicated from extend side 29, past splined connection 21, to the left face of piston 3. Since the area of the piston 3 exposed to the extend pressure is greater than that exposed to the retract pressure, the actuator will extend. As it does so, the piston moves away from the lock spring 26, thus causing the lock spring to be fully extended, at which point it is no longer effective in applying a locking force to the movable lock sleeve 19.

If during extension of the actuator the system pressure should drop sufficiently, a return spring 70 acting on the outer end of the lock piston 50 may start to return the lock piston and plunger 45 to their original position. However, a torsion spring 71 acting on the lock release lever 36 will still maintain the movable lock sleeve 19 out of engagement with the worm wheel 15 so that the actuator does not suddenly stop. Any such return movement of the lock piston and plunger will not affect the position of the lock release lever because of the length of the slot 47 in the lock plunger which accommodates such movement. However, such return movement of the lock piston could cut down on the flow of fluid through the annulus 65 to the extend side of the actuator. To reduce the possibility of that happening when the extend pressure decreases due, for example, to an aiding air load pulling the actuator out, a restrictor 72 may be provided in the passageway 66 communicating with the annulus 65 to help maintain the pressure on the lock piston high enough such that it will not cycle during extension of the actuator. The restrictor 72 has a central passage through the left end which communicates with radial holes in the restrictor intermediate the ends thereof to provide for restricted flow through the restrictor.

To retract the actuator, the pressure acting on the extend side of the actuator is reduced, as by connecting the port 60 and thus the lock-in annulus 59 in communication therewith to return pressure, while still maintaining system pressure on the retract side of the actuator. With reduced pressure at the lock-in annulus, the return spring 70 acting on the lock piston 50 will cause the lock piston to return to its original position blocking fluid flow from the extend side of the actuator through the lock valve 50. However, return flow from the extend side of the actuator still occurs through a check valve 75 in another passage 76 in the valve housing 31 providing communication between the annulus 65 and annulus 59 through such check valve as shown in FIG. 4.

As the actuator retracts, the lock is prevented from prematurely engaging by the torsin spring 71 which maintains the lock release lever 36 in the unlocking position shown in FIG. 5 until the piston 3 engages the lock spring 26 and compresses same sufficiently to overcome the relatively light force of the torsion spring and force the lock teeth 23 into engagement. This normally occurs within the last 3/10 inch or so of the retract stroke. However, the actuator will continue to move in the stow direction until the actuator piston engages the internal stop 22 because of the torque developed by the screw shaft 10 and the ramp angles of the lock teeth 23 which cause the lock teeth to ratchet over each other. When the actuator piston engages the retract stop, the screw shaft also stops, and since the lock teeth are already in engagement with each other, any motion that tends to extend the actuator will cause the locking faces of the lock teeth to engage thus providing a positive lock against such motion.

From the foregoing, it will now be apparent that the sequence-power valve of the present invention not only releases the lock mechanism for the actuator when fluid pressure is applied thereto, but such valve also ports such fluid pressure directly to the actuator to cause same to move in the desired direction following release of the lock. Accordingly, the need for a separate valve member and the associated external tubing for interconnecting the parts to supply fluid pressure to the actuator after the actuator has been unlocked is eliminated. Provision is also made for maintaining the valve mechanism substantially fully open for maximum flow to the actuator during actuation thereof despite fluctuations in such fluid pressure. Moreover, once the lock mechanism is disengaged, such disengagement is assured until such time as the actuator is returned to the original position at which reengagement of the lock occurs.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder containing a piston-rod assembly that is extendable under pressure, releasable lock means for preventing said piston-rod assembly from extending, and lock release means for releasing said lock means, said lock release means including a fluid pressure operated lock piston movable in a direction to release said lock means, and passage means which are unblocked by such lock piston movement for porting such fluid pressure directly to said actuator to cause said piston-rod assembly to extend upon release of said lock means, means for transmitting a lock release force from said lock release means to said lock means comprising a lock release lever mounted for pivotal movement, and means for causing pivotal movement of said lever during movement of said lock piston in a direction to release said lock means, means for effecting return movement of said lock piston when the fluid pressure acting on said lock piston is reduced, and means for maintaining said lever in such position for releasing said lock means during such return movement of said lock piston.

2. The actuator of claim 1 wherein said lock release means includes a housing containing a bore, a fluid pressure inlet communicating with said passage means through said bore, said lock piston being movable within said bore between a first position at which said lock means is engaged and fluid communication between said passage means and fluid pressure inlet is blocked by said lock piston and a second position at which said lock means is released and fluid communication between said passage means and fluid pressure inlet through said bore is unblocked by said lock piston.

3. The actuator of claim 1 wherein said means for maintaining said lever in such position for releasing said lock means comprises a torsion spring acting on said lever urging same in a direction to release said lock means.

4. The actuator of claim 1 wherein said means for effecting return movement of said lock piston comprises a return spring acting on said lock piston.

5. The actuator of claim 1 further comprising a lost motion connection between said lever and lock piston permitting such return movement of said lock piston without affecting the position of said lever.

6. The actuator of claim 5 further comprising a lock plunger connected to said lock piston for movement therewith, said lost motion connection comprising a slot in said lock plunger in which one end of said lever is received.

7. A fluid actuator comprising a cylinder containing a piston-rod assembly that is extendable under pressure, releasable lock means for preventing said piston-rod assembly from extending, and lock release means for releasing said lock means, said lock release means including a fluid pressure operated lock piston movable in a direction to release said lock means, and passage means which are unblocked by such lock piston movement for porting such fluid pressure directly to said actuator to cause said piston-rod assembly to extend upon release of said lock means, means for transmitting a lock release force from said lock release means to said lock means comprising a lock release lever mounted for pivotal movement, and means for causing pivotal movement of said lock piston during movement of said lock piston in a direction to release said lock means, and a lock plunger connected to said lock piston for movement therewith, said means for causing pivotal movement of said lever during movement of said lock piston comprising a slot in said lock plunger in which one end of said lever is received.

8. The actuator of claim 7 wherein said lock piston has a stem on one end and a flange on said stem, and said lock plunger has a longitudinal slot in one end for receipt of said stem and a transverse slot for receipt of said flange to accommodate any slight axial misalignment that may exist bewteen said lock piston and plunger, said slots extending into said lock plunger from the same side to permit insertion of said stem and flange into said slots before insertion of such lock piston and plunger into said bore.

9. The actuator of claim 7 wherein said lock release means includes a housing containing a bore, a fluid pressure inlet communicating with said passage means through said bore, said lock piston being movable within said bore between a first position at which said lock means is engaged and fluid communication between said passage means and fluid pressure inlet is blocked by said lock piston and a second position at which said lock means is released and fluid communication between said passage means and fluid pressure inlet through said bore is unblocked by said lock piston.

10. The actuator of claim 9 wherein said passage means contains a restrictor for maintaining a back pressure in said bore acting on said lock piston urging said lock piston toward said second position when fluid pressure is applied to said fluid pressure inlet.

11. The actuator of claim 9 further comprising means for permitting return flow of fluid from said actuator to said fluid pressure inlet when said lock piston is in said first position and the fluid pressure acting on said actuator is greater than the fluid pressure at said fluid pressure inlet to permit said piston-rod assembly to retract.

12. A fluid actuator comprising a cylinder containing a piston-rod assembly that is extendable under pressure, releasable lock means for preventing said piston-rod assembly from extending, and lock release means for releasing said lock means, said lock release means including a fluid pressure operated lock piston movable in a direction to release said lock means, and passage means which are unblocked by such lock piston movement for porting such fluid pressure directly to said actuator to cause said piston-rod assembly to extend upon release of said lock means, said lock release means comprising a housing having an extension on one end adapted to be received in a port in one side of said actuator, and means for transmitting a lock release force from said lock release means to said lock means through said port, said passage means communicating with said actuator through said extension and port, said means for transmitting a lock release force from said lock release means to said lock means comprising a lock release lever mounted for pivotal movement in said extension, and means for causing pivotal movement of said lever during movement of said lock piston in a direction to release said lock means, means for effecting return movement of said lock piston when the fluid pressure acting on said lock piston is reduced, and means for maintaining said lever in such position for releasing said lock means during such return movement of said lock piston.

13. The actuator of claim 12 wherein said means for maintaining said lever in such position for releasing said lock means comprises a torsion spring acting on said lever urging same in a direction to release said lock means.

14. The actuator of claim 12 wherein said means for effecting return movement of said lock piston comprises a return spring acting on said lock piston.

15. The actuator of claim 12 further comprising a lost motion connection between said lever and lock piston permitting such return movement of said lock piston without affecting the position of said lever.

16. The actuator of claim 15 further comprising a lock plunger connected to said lock piston for movement therewith, said lost motion connection comprising a slot in said lock plunger in which one end of said lever is received.

17. A fluid actuator comprising a cylinder containing a piston-rod assembly that is extendable under pressure, releasable lock means for preventing said piston-rod assembly from extending, and lock release means for releasing said lock means, said lock release means including a fluid pressure operated lock piston movable in a direction to release said lock means, and passage means which are unblocked by such lock piston movement for porting such fluid pressure directly to said actuator to cause said piston-rod assembly to extend upon release of said lock means, said lock release means comprising a housing having an extension on one end adapted to be received in a port in one side of said actuator, and means for transmitting a lock release force from said lock release means to said lock means through said port, said passage means communicating with said actuator through said extension and port, said means for transmitting a lock release force from said lock release means to said lock means comprising a lock release lever mounted for pivotal movement in said extension, and means for causing pivotal movement of said lever during movement of said lock piston in a direction to release said lock means, and a lock plunger connected to said lock piston for movement therewith, said means for causing pivotal movement of said lever during movement of said lock piston comprising a slot in said lock plunger in which one end of said lever is received.

18. The actuator of claim 17 wherein said lock piston has a stem on one end and a flange on said stem, and said lock plunger has a longitudinal slot in one end for receipt of said stem and a transverse slot for receipt of said flange to accommodate any slight axial misalignment that may exist between said lock piston and plunger, said slots extending into said lock plunger from the same side to permit insertion of said stem and flange into said slots before insertin of such lock piston and plunger into said bore.

19. A fluid actuator comprising a cylinder containing a piston-rod assembly that is extendable under pressure, releasable lock means for preventing said piston-rod assembly from extending, and lock release means for releasing said lock means, said lock release means including a fluid pressure operated lock piston movable in a direction to release said lock means, and passage means which are unblocked by such lock piston movement for porting such fluid pressure directly to said actuator to cause said piston-rod assembly to extend upon release of said lock means, said lock release means including a housing containing a bore, a fluid pressure inlet communicating with said passage means through said bore, said lock piston being movable within said bore between a first position at which said lock means is engaged and fluid communication between said passage means and fluid pressure inlet is blocked by said lock piston and a second position at which said lock means is released and fluid communication between said passage means and fluid pressure inlet through said bore is unblocked by said lock piston, and means for permitting return flow of fluid from said actuator to said fluid pressure inlet when said lock piston is in said first position and the fluid pressure acting on said actuator is greater than the fluid pressure at said fluid pressure inlet to permit said piston-rod assembly to retract, said means for permitting return flow of fluid from said actuator to said fluid pressure inlet comprising another passage means between said fluid pressure inlet and said actuator, and check valve means in said another passage means permitting return flow of fluid through said another passage means to said fluid pressure inlet when the fluid pressure acting on said actuator is greater than the fluid pressure in said fluid pressure inlet.

20. A fluid actuator comprising a cylinder, an actuator piston axially movable within said cylinder, a member rotatably journaled in said cylinder and operatively connected to said actuator piston such that axial movement of said actuator piston effects and is dependent on rotation of said member, releasable lock means engageable with said member for preventing rotation of said member thereby locking said actuator piston against movement, and lock release means for releasing said lock means, said lock release means comprising a fluid pressure operated sequence-power valve which when acted upon by fluid pressure first creates a lock release force for releasing said lock means and then ports such fluid pressure directly to said actuator to cause the desired movement of said actuator piston following release of said lock means, said sequence-power valve including a housing containing a bore, passage means providing communication between said actuator and said bore, a fluid pressure inlet communicating with said passage means through said bore, and a lock piston movable within said bore between a first position at which said lock means is engaged and fluid communication between said fluid pressure inlet and passage means through said bore is blocked by said lock piston and a second position at which said lock means is released and such fluid communication is unblocked by said lock piston, said housing having an extension on one end adapted to be received in a port in one side of said actuator, and means for transmitting a lock release force from said lock piston to said lock means through said port, said passage means communicating with said actuator through said extension and port, said means for transmitting a lock release force from said lock piston to said lock means comprising a lock release lever mounted for pivotal movement in said extension, and means for causing pivotal movement of said lever during movement of said lock piston in a direction to release said lock means, and a lock plunger connected to said lock piston for movement therewith, said means for causing pivotal movement of said lever during movement of said lock piston comprising a slot in said lock plunger in which one end of said lever is received.

21. The actuator of claim 20 further comprising means for causing return movement of said lock piston to said first position when the fluid pressure in said fluid pressure inlet is reduced, and means for maintaining said lever in such position for releasing said lock means during such return movement of said lock piston.

22. The actuator of claim 21 wherein said means for maintaining said lever in such position comprises a torsion spring acting on said lever urging same in a direction to release said lock means, said slot in said lock plunger permitting return movement of said lock piston without affecting the position of said lever.

23. A fluid actuator comprising a cylinder, an actuator piston axially movable within said cylinder, a member rotatably journaled in said cylinder and operatively connected to said actuator piston such that axial movement of said actuator piston effects and is dependent on rotation of said member, releasable lock means engageable with said member for preventing rotation of said member thereby locking said actuator piston against movement, and lock release means for releasing said lock means, said lock release means comprising a fluid pressure operated sequence-power valve which when acted upon by fluid pressure first creates a lock release force for releasing said lock means and then ports such fluid pressure directly to said actuator to cause the desired movement of said actuator piston following release of said lock means, and means for permitting return flow of fluid from said actuator to said fluid pressure port when said lock piston is in said first position and the fluid pressure acting on said actuator is greater than the fluid pressure in said fluid pressure inlet, said means for permitting return flow of fluid from said actuator to said fluid pressure inlet comprising another passage means between said actuator and fluid pressure inlet containing a check valve therein.

24. The actuator of claim 23 wherein said sequence-power valve includes a housing containing a bore, passage means providing communication between said actuator and said bore, a fluid pressure inlet communicating with said passage means through said bore, and a lock piston movable within said bore between a first pistion at which said lock means is engaged and fluid communication between said fluid pressure inlet and passage means through said bore is blocked by said lock piston and a second position at which said lock means is released and such fluid communication is unblocked by said lock piston.

25. The actuator of claim 24 further comprising a restrictor in said passage means for maintaining a back pressure in said bore acting on said lock piston to aid in maintaining said lock piston in said second position when fluid pressure is applied to said fluid pressure inlet.

26. The actuator of claim 24 wherein said housing has an extension on one end adapted to be received in a port in one side of said actuator, and means are provided for transmitting a lock release force from said lock piston to said lock means through said port, said passage means communicating with said actuator through said extension and port.

27. The actuator of claim 26 wherein said means for transmitting a lock release force from said lock piston to said lock means comprises a lock release lever mounted for pivotal movement in said extension, and means for causing pivotal movement of said lever during movement of said lock piston in a direction to release said lock means.

* * * * *